(12) United States Patent
Takagi et al.

(10) Patent No.: US 10,627,644 B2
(45) Date of Patent: Apr. 21, 2020

(54) VIRTUAL IMAGE DISPLAY DEVICE

(71) Applicant: SEIKO EPSON CORPORATION, Tokyo (JP)

(72) Inventors: Masayuki Takagi, Azumino (JP); Takashi Takeda, Suwa (JP); Akira Komatsu, Kamiina-gun (JP); Toshiaki Miyao, Matsumoto (JP); Tokito Yamaguchi, Azumino (JP)

(73) Assignee: SIEKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/284,189

(22) Filed: Feb. 25, 2019

(65) Prior Publication Data

US 2019/0265493 A1 Aug. 29, 2019

(30) Foreign Application Priority Data

Feb. 26, 2018 (JP) .................................. 2018-031642

(51) Int. Cl.
*G02B 27/28* (2006.01)
*G03B 21/28* (2006.01)
*G02B 5/30* (2006.01)
*G02B 27/01* (2006.01)
*G02B 17/08* (2006.01)

(52) U.S. Cl.
CPC .............. *G02B 27/28* (2013.01); *G02B 5/30* (2013.01); *G02B 17/086* (2013.01); *G02B 27/0172* (2013.01); *G03B 21/28* (2013.01); *G02B 2027/011* (2013.01)

(58) Field of Classification Search
CPC .............. G02B 27/286; G02B 27/0172; G02B 5/3025; G03B 21/28
See application file for complete search history.

(56) References Cited

U.S. PATENT DOCUMENTS

| | | | |
|---|---|---|---|
| 5,801,885 A | 9/1998 | Togino | |
| 5,853,240 A | 12/1998 | Tanaka et al. | |
| 6,094,242 A | 7/2000 | Yamanaka | |
| 6,480,338 B1 | 11/2002 | Ohzawa | |
| 9,581,827 B1 | 2/2017 | Wong et al. | |
| 2014/0204479 A1* | 7/2014 | Asami ................... | G02B 13/04 359/762 |
| 2016/0238853 A1* | 8/2016 | Kimura ............. | G02F 1/133308 |
| 2018/0031835 A1 | 2/2018 | Hoppe | |

FOREIGN PATENT DOCUMENTS

| | | |
|---|---|---|
| JP | H07-270715 A | 10/1995 |
| JP | H08-327940 A | 12/1996 |
| JP | H09-182112 A | 7/1997 |

OTHER PUBLICATIONS

Jul. 22, 2019 extended European Search Report issued in European Patent Application No. 19158794.8.

* cited by examiner

*Primary Examiner* — Ryan D Howard
(74) *Attorney, Agent, or Firm* — Oliff PLC (57) ABSTRACT

A first lens and a second lens are bonded to each other and configured to be short in an optical axis direction. Further, by providing a half mirror in a bonding portion between a convex surface and a concave surface, power is given when folding an optical path, and additionally, by setting a refractive index of the first lens larger than a refractive index of the second lens, an image with a wide angle of view can be formed.

9 Claims, 10 Drawing Sheets

VIRTUAL IMAGE DISPLAY DEVICE

BACKGROUND

1. Technical Field

The invention relates to a virtual image display device that provides, to an observer, an image formed by an image element and the like, in a state of being mounted on the observer.

2. Related Art

As an virtual image display device or a head mounted type display device such as a head-mounted display to be mounted on the head of an observer, for example, as described in JP-A-8-327940, a closed type with a wide visual field that achieves a thin optical system with a wide angle of view by providing a partial optical folding portion utilizing a half mirror has been known. Note that, the head-mounted display is also described as an HMD in the following.

However, in the HMD, when reduction in size or thickness of a device is attempted while a thin optical system with a wide angle of view is achieved, a burden on the optical system increases. That is, a curved surface shape or a refractive index of a lens configuring the optical system is preferably set to easily obtain power.

SUMMARY

A virtual image display device according to an aspect of the invention includes an image element configured to display an image, a first lens disposed at a location where image light from the image element is extracted, and including a convex surface facing the image element side, a second lens disposed further toward the image element side than the first lens and including a concave surface to be bonded to the convex surface of the first lens, a half mirror provided in a bonding portion between the convex surface and the concave surface, and a transmission/reflection selection member provided at a light emitting side of the first lens and configured to selectively transmit or reflect the light depending on a light polarization state, wherein a refractive index of the first lens is larger than a refractive index of the second lens.

In the above-described virtual image display device, by adopting a configuration in which the first lens and the second lens are bonded to each other, reduction in size or thickness is achieved. On the other hand, by providing the half mirror in the bonding portion between the convex surface and the concave surface in an optical path, power is given when folding the optical path, and additionally, since the refractive index of the first lens is larger than the refractive index of the second lens, an image with a wide angle of view can be formed.

BRIEF DESCRIPTION OF THE DRAWINGS

The invention will be described with reference to the accompanying drawings, wherein like numbers reference like elements.

DESCRIPTION OF EXEMPLARY EMBODIMENTS

A virtual image display device according to an exemplary embodiment of the invention will be described below in detail with reference to FIG. 1 and the like.

Figure 1:
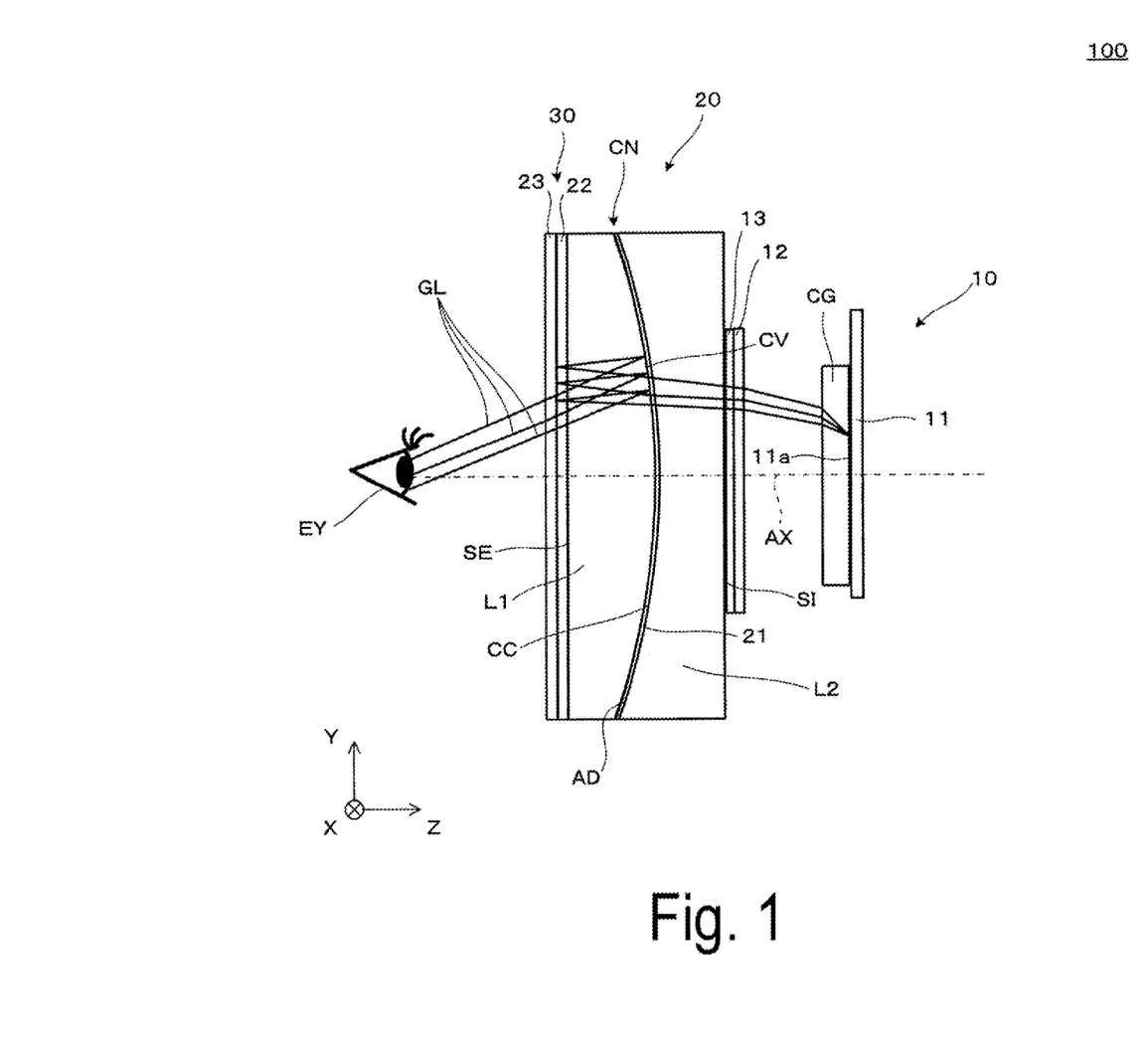
FIG. 1 illustrates a side sectional view conceptually describing a virtual image display device and an optical path of image light of the virtual image display device according to an exemplary embodiment.

As conceptually illustrated in FIG. 1, a virtual image display device 100 of the exemplary embodiment includes an image display device 10 as an image element (image display unit) and an enlargement optical system 20, and serves as a virtual image display device capable of causing an observer or a user wearing the virtual image display device 100 to visually recognize image light (image light) by a virtual image, that is, a head-mounted display (HMD). Here, FIG. 1 conceptually illustrates a state viewed from a side in a case in which the observer wears the virtual image display device 100, and an optical axis AX of an optical system in the virtual image display device 100 is in a Z direction. Additionally, among in-plane directions of a surface orthogonal to the Z direction, a horizontal direction that is a right-left direction is an X direction, and among the in-plane directions, a direction orthogonal to the X direction is a Y direction. In this case, a horizontal direction assumed to be a direction in which the right and left eyes of the observer are aligned is the X direction. An up-down direction for the observer which is a direction orthogonal to the horizontal direction is a vertical direction, and in FIG. 1, is the Y direction. Additionally, in the illustration, a location of an eye EY of the observer, in a configuration of the virtual image display device 100, is a location of the pupil assumed as a location on which the eye EY of the observer exists.

Note that, the image display device 10 and the enlargement optical system 20 are prepared for each of the right eye and the left eye and are configured as a right-left pair. However, here, since a configuration of a left side and a configuration of a right side are symmetric, only one side (for the left eye) of the left and right sides is illustrated, and the other side is omitted. In other words, in FIG. 1, a +X side is an outer side (a side toward the ear), and a −X side is an inner side (a side toward the nose). Note that, the virtual image display device 100, as only one of the right-left pair, functions as the virtual image display device, namely, functions independently. Further, the virtual image display device can also be configured for a single eye without the right-left pair configuration.

An example of a configuration and the like of each of units for guiding image light by the virtual image display device 100 will be conceptually explained below.

The image display device 10 includes a panel unit 11 being a main body part to form an image and configured to emit image light GL, and a cover glass CG for covering a light emitting surface 11a of the panel unit 11. Here, as the image display device 10, a small one is adopted, and as in the illustration, the image display device 10 is configured, at least, to be smaller than the enlargement optical system 20, with respect to a direction orthogonal to the optical axis AX. Specifically, for example, in the example in the illustration, it is obvious that a size of an image display area of the image display device 10 is smaller than a size of an optical surface of a second lens L2 of the enlargement optical system 20 described later.

The panel unit 11 can be an image element (image display element) configured of a self-light-emitting type element (OLED) such as an organic EL element, for example. Further, in addition to an image display element (image element) that is a transmission-type spatial light modulating device, for example, a configuration may be adopted that includes an illumination device (not illustrated) that is a backlight for emitting illumination light to the image display element, and a driving control unit (not illustrated) configured to control operations.

Here, from a viewpoint of definition enhancement or the like, as an image element used for the panel unit 11 of the image display device 10, for example, a case is conceivable in which a small one such as a micro display is desirably adopted. In order to achieve the definition enhancement, for example, a liquid crystal panel using an HTPS or Si backplane, or an OLED panel needs to be applied, because there is proportional relation between a panel size and a panel unit price for each of these panels. That is, from a practical viewpoint of reducing product costs or the like, a smaller panel needs to be applied. However, when reducing a panel in size is attempted while an angle of view is widened, that is, when applying a smaller panel size is attempted, a focal distance of an optical system also needs to be reduced. That is, a curvature radius of a lens needs to be reduced. In this case, in a component of light on a wide visual field angle side, due to a restriction of a total reflection condition on a lens surface, a shape with strong curvature cannot be adopted, and thus desirable reduction in panel size is not possibly achieved.

In the virtual image display device 100 of the exemplary embodiment, in view of the above-described conditions, reduction of the panel unit 11 in size is achieved.

Figure 2:
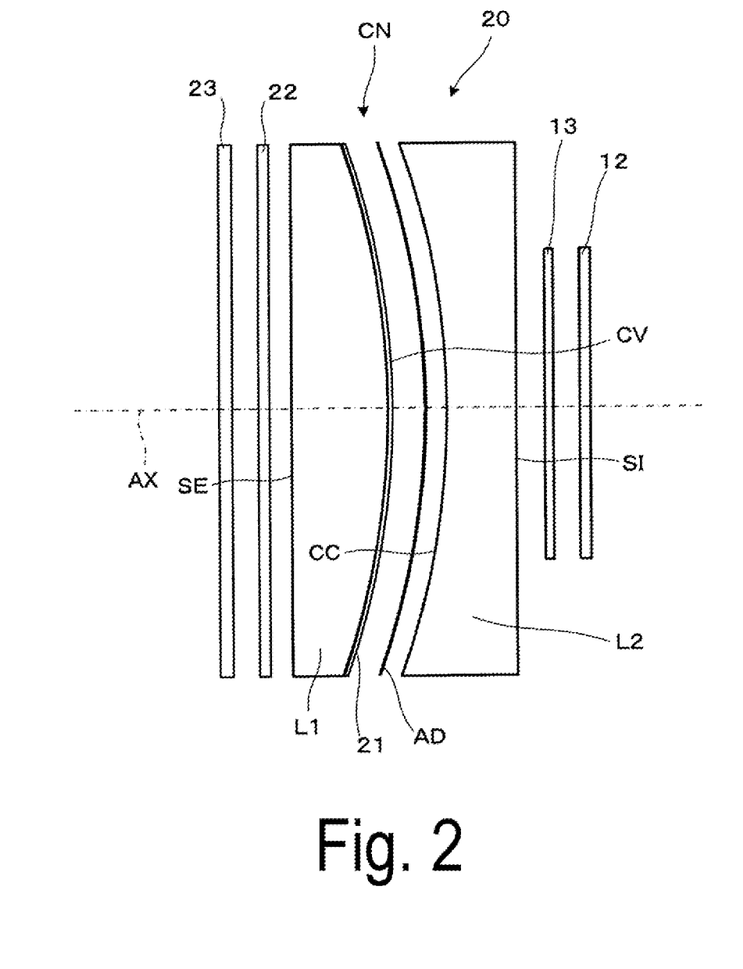
FIG. 2 illustrates an exploded view describing a configuration of an enlargement optical system.

As illustrated in FIG. 1 and FIG. 2, the enlargement optical system 20, in addition to two lenses, a first lens L1 and the second lens L2, bonded and arranged in order from an observer side, includes a polarization plate 12 and an incident side polarization conversion member 13 on a light incident side, includes a half mirror 21 in a bonding portion between the first lens L1 and the second lens L2, and includes a transmission/reflection selection member 30 on a light emitting side. The transmission/reflection selection member 30 is configured with an emitting side polarization conversion member 22, and a semi-transmissive reflection type polarization plate 23. Note that, each of the first lens L1 and the second lens L2 is a glass lens.

First, the first lens L1 is a planoconvex lens disposed on an extracting location for extracting the image light GL to the outside of a device, of the lenses configuring the enlargement optical system 20, in a front-of-eye side of the observer, that is, in a −Z side near the eye EY, includes a light emitting plane SE being a flat surface as a light emitting surface on the front-of-eye side, and includes a convex surface CV on an image display device 10 side being an opposite side to the light emitting plane SE. The first lens L1 is a highly refractive lens with a refractive index of 1.8 or larger, for example, so as to obtain an image with a sufficiently wide angle of view. Further, the convex surface CV is a spherical surface. That is, the first lens L1 is a spherical surface planoconvex lens. Note that, in the following, a value of a refractive index indicates a value of nd. Additionally, a value of an Abbe's number indicates a value of vd.

Next, the second lens L2 is a planoconcave lens disposed closer to the image display device 10 side than the first lens L1, includes a concave surface CC on the front-of-eye side, and includes a light incident plane SI being a flat surface as a light incident surface to which the image light GL from the image display device 10 is incident on the image display device 10 side being an opposite side to the concave surface CC. A refractive index of the second lens L2 is equal to a refractive index of the first lens L1, or is smaller than the refractive index of the first lens L1. Further, the concave surface CC includes a spherical surface with a curved surface shape corresponding to the convex surface CV of the first lens L1. That is, the second lens L2 is a spherical surface planoconcave lens.

The first lens L1 and the second lens L2 are bonded at the convex surface CV and the concave surface CC, and form a bonding portion CN.

Additionally, both the light emitting plane SE and the light incident plane SI are parallel to the light emitting surface 11a of the image display device 10, and in the example in the illustration, are parallel to an XY plane. Note that, as a tolerance of parallelism in this case, for example, within ±2° is conceivable.

The half mirror 21 is a semi-reflective and semi-transmissive film for transmitting part of image light and reflecting another part of the image light, and is formed with a dielectric multilayer film, a metal film, and the like, for example. As in the illustration, the half mirror 21 is formed between the first lens L1 and the second lens L2. That is, the half mirror 21 is provided in the bonding portion CN. Thus, the half mirror 21 is formed in a concavely curved surface shape when viewed from the observer side.

Here, an example of forming the half mirror 21 or the bonding portion CN will be described. As an example of a configuration of the enlargement optical system 20 illustrated in an exploded view in FIG. 2, firstly, a film to be the half mirror 21 is formed on the convex surface CV of the first lens L1 by vapor deposition. Next, the formed film of the half mirror 21 and the concave surface CC of the second lens L2 are bonded by an adhesive, this adhesive cures to form a bonding film AD, and thus the bonding portion CN is formed. Note that, although details will be described later, by providing the bonding film AD not on a first lens L1 side, but on a second lens L2 side, the number of passages through the bonding film AD can be reduced when the image light GL passes through the enlargement optical system 20.

The polarization plate 12 is stuck on the light incident plane SI of the second lens L2 via the incident side polarization conversion member 13, and is located closest to the image display device 10 side of the enlargement optical system 20. The polarization plate 12 is a transmissive polarization plate, and is a member for extracting a linearly polarized light component of the image light GL when the image light GL passes through from the image display device 10.

The incident side polarization conversion member 13 is a quarter wavelength plate, that is, a λ/4 plate, and converts a polarization state of passing light. As in the illustration, the incident side polarization conversion member 13 is stuck on the light incident plane SI of the second lens L2. Additionally, the incident side polarization conversion member 13 is located on an optical path downstream side of the polarization plate 12, and converts the image light GL converted to the linearly polarized light by passing through the polarization plate 12 to circularly polarized light.

The transmission/reflection selection member 30 is, as described above, configured with the emitting side polarization conversion member 22, and the semi-transmissive reflection type polarization plate 23, and selectively performs transmission or reflection according to a polarization state of light.

The emitting side polarization conversion member 22 of the transmission/reflection selection member 30 is the quarter wavelength plate, that is, the λ/4 plate, and converts a polarization state of passing light. As in the illustration, the polarization conversion member 22 is stuck on the light emitting plane SE of the first lens L1, and is provided between the first lens L1 and the semi-transmissive reflection type polarization plate 23. The polarization conversion member 22 converts a polarization state of a component traveling back and forth between the semi-transmissive reflection type polarization plate 23 and the half mirror 21. Here, the polarization conversion member 22 being the quarter wavelength plate converts the image light GL that is in the circularly polarization state to the linearly polarized light, or, conversely, the image light GL that is in the linearly polarization state to the circularly polarized light.

The semi-transmissive reflection type polarization plate 23 of the transmission/reflection selection member 30 is stuck on the light emitting plane SE via the emitting side polarization conversion member 22. That is, the semi-transmissive reflection type polarization plate 23 is a member disposed on a side closest to a location of the pupil assumed as a location of the eye EY of the observer, and emits the image light GL toward the front-of-eye side of the observer. In this case, the semi-transmissive reflection type polarization plate 23 is configured with a reflective type wire grid polarization plate. That is, the semi-transmissive reflection type polarization plate 23 changes a transmission/reflection characteristic depending on whether a polarization state of an incident component is in a polarization transmission axis direction or not. In this case, since the polarization conversion member 22 is disposed on an optical path upstream side of the semi-transmissive reflection type polarization plate 23, a polarization state of light changes each time the light passes through the polarization conversion member 22, and the semi-transmissive reflection type polarization plate 23 transmits or reflects the incident component according to the change. Here, as an example, a horizontal direction (the X direction) assumed as a direction in which the eyes of the observer are arranged is the polarization transmission axis direction. Note that the semi-transmissive reflection type polarization plate 23 configured with the reflection type wire grid polarization plate changes the transmission/reflection characteristic in accordance with the polarization state of the incident component, and thus, may also be referred to as a reflection type polarization plate.

The transmission/reflection selection member 30 is, as described above, configured with the emitting side polarization conversion member 22, and the semi-transmissive reflection type polarization plate 23, and thus can change a polarization state of light and according to the change, selectively transmit or reflect the light.

As described above, in the virtual image display device 100 of the exemplary embodiment, the enlargement optical system 20 is configured with two lenses being main parts of an optical system, these lenses are bonded and configured not to provide an air space, and each of the light incident plane SI and the light emitting plane SE being a surface of the lens is a flat surface. Thus, especially, the virtual image display device 100 can be shortened along an optical axis direction, and reduced in size or thickness. Additionally, since each of the light incident plane SI and the light emitting plane SE is the flat surface, as described above, on these planes, the polarization plate, the quarter wavelength plate, the reflection type wire grid polarization plate, and the like can be directly and easily stuck as various optical sheets, and thus reduction of the number of components, reduction of optical components in size, and performance improvement are enabled.

An optical path of the image light GL will be briefly described below with reference to FIG. 1. First, the image light GL modulated in the panel unit 11 of the image display device 10 is emitted toward the enlargement optical system 20. The emitted image light GL is converted to linearly polarized light at the polarization plate 12 being a transmissive polarization plate located closest to the image display device 10 side of the enlargement optical system 20. Here, a polarization direction of the linearly polarized light after passing through the polarization plate 12 is a first direction.

The image light GL, after converted to the linearly polarized light in the first direction by the polarization plate 12, is converted to circularly polarized light by the incident side polarization conversion member 13 being a first quarter wavelength plate, and is incident on the second lens L2 from the light incident plane SI. Subsequently, the image light GL reaches an interface between the second lens L2 and the first lens L1, that is, the half mirror 21 provided in the bonding portion CN. Of the image light GL, some components pass through the half mirror 21, and are converted to linearly polarized light by the polarization conversion member 22 that is a second quarter wavelength plate. Here, since the linearly polarized light, after passing through the polarization plate 12, passes through the quarter wavelength plate twice, and thus the polarization direction is a different direction with respect to the first direction by 90°. Here, this is a second direction. The image light GL, after converted to the linearly polarized light in the second direction by the polarization conversion member 22, reaches the semi-transmissive reflection type polarization plate 23 or a reflection type polarization plate.

Here, the semi-transmissive reflection type polarization plate 23 is set to transmit linearly polarized light in the first direction, and reflect linearly polarized light in the second direction. From another perspective, a transmission characteristic of the polarization plate 12 or a transmission/reflection selection characteristic of the semi-transmissive reflection type polarization plate 23 is configured as such. In this case, the image light GL being the linearly polarized light in the second direction is reflected by the semi-transmissive reflection type polarization plate 23, once more becomes the circularly polarized light at the polarization conversion member 22 being the quarter wavelength plate, and reaches the half mirror 21. At the half mirror 21, some components of the image light GL pass through as they are, but remaining components are reflected, and the components of the reflected image light GL are this time converted to the linearly polarized light in the first direction by the polarization conversion member 22 being the quarter wavelength plate. The components of the image light GL converted to the linearly polarized light in the first direction pass through the semi-transmissive reflection type polarization plate 23, and the image light GL reaches the location of the pupil assumed as the location on which the eye EY of the observer exists.

Note that, as described above, the half mirror 21 is configured by being vapor-deposited on the first lens L1 side, and subsequently by being bonded and fixed on the second lens L2 via the bonding film AD. Accordingly, the image light GL, in the above optical path, after reflected by the semi-transmissive reflection type polarization plate 23, does not pass through the bonding film AD, but is reflected by the half mirror 21. That is, the image light GL passes through the bonding film AD only once when passing through between the first lens L1 and the second lens L2 for the first time in this configuration. As described above, by reducing the number of passages through the bonding film AD as far as possible, reduction in component amounts and deterioration of the image light GL are suppressed.

As described above, in the enlargement optical system 20 in the virtual image display device 100 of the exemplary embodiment, the half mirror 21 and the transmission/reflection selection member 30 can fold the optical path of the image light GL, and the image light GL can have a wide angle of view by utilizing the reflection at the half mirror 21 provided on the curved surface, and the like.

Here, in the exemplary embodiment, the two lenses L1 and L2 in the enlargement optical system 20, have the light incident plane SI and the light emitting plane SE that are the flat surfaces. Accordingly, a portion of curved surface parts on which the two lenses L1 and L2 are bonded is in charge of optical path adjustment for each pencil of rays configuring the image light GL. That is, a reflection action at the half mirror 21 formed on this surface, and a refraction action due to a refractive index difference or the like between the two lenses L1 and L2 adjust the optical path.

Figure 3:
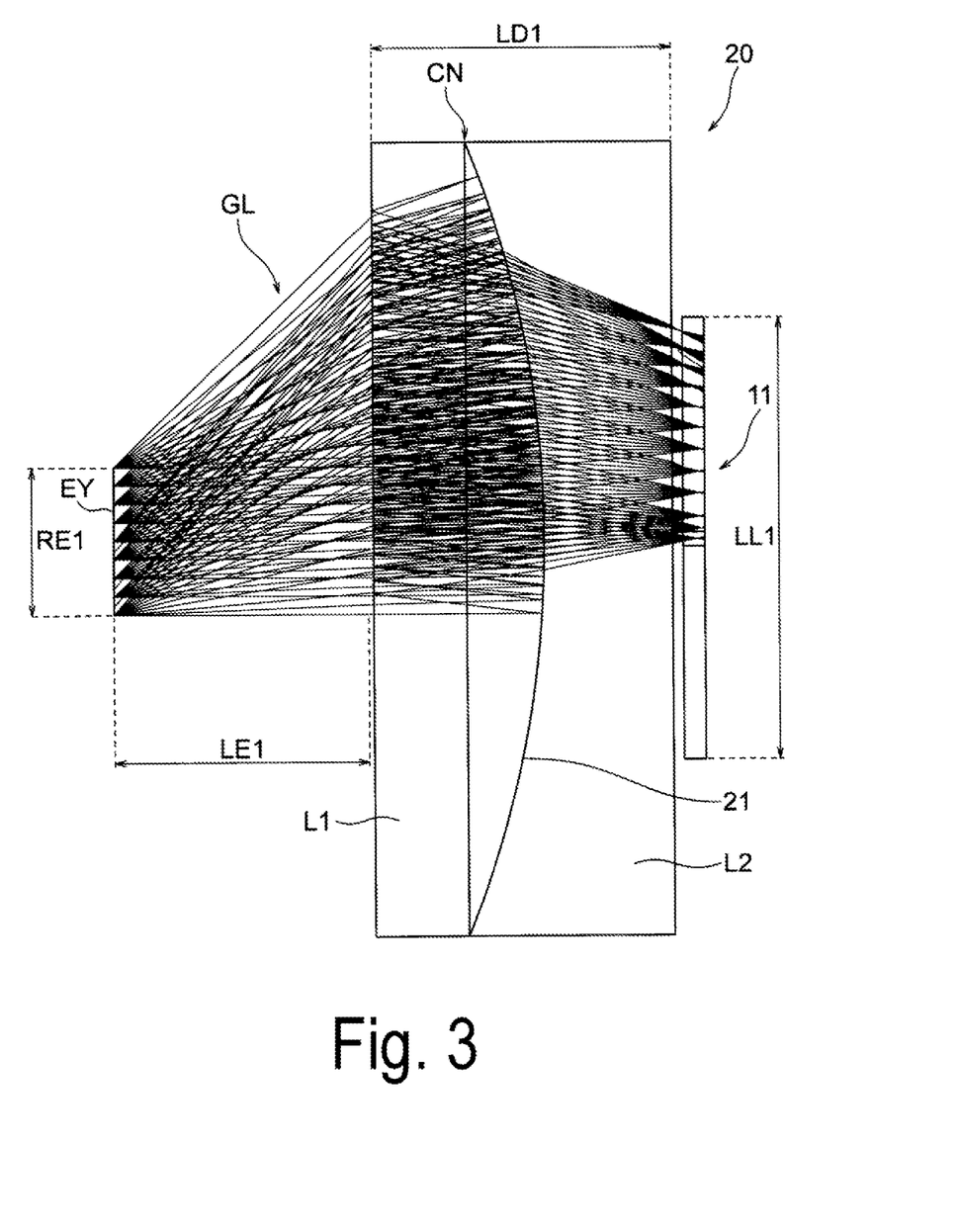
FIG. 3 illustrates a ray diagram in an example of the virtual image display device.

FIG. 3 is a ray diagram in an example of the virtual image display device 100, and illustrates a case in which, for the two lenses L1 and L2, as glass materials each with a different refractive index, the first lens L1 with a refractive index $n_1=2.00$, and the second lens L2 with a refractive index $n_2=1.55$ are used as an example. That is, the refractive index $n_1$ of the first lens L1 is larger than the refractive index $n_2$ of the second lens L2. Note that, as for an Abbe's number of each glass material, an Abbe's number of the first lens L1 is $v_1=29.1$, and an Abbe's number of the second lens L2 is $v_2=75.5$.

Additionally, as in the illustration, here, a length of a side of a panel size corresponding to a size of the image display area of the image display device 10 is a length LL1, an entire length of the enlargement optical system 20 in the optical axis direction is a length LD1, a length of an eye relief being a distance from the enlargement optical system 20 to the location of the eye EY is a length LE1, and a diameter of an eye ring at the location of the eye EY is a diameter RE1.

Of these, the length LL1 of the side of the panel size is preferably equal to or less than 2.5 inches, further equal to or less than 1 inch (more preferably, about 12 to 13 mm) from a viewpoint of demand for reduction in size. In the exemplary embodiment, a small panel such as a micro display as the image display device 10 is used, an image by this panel is enlarged by the enlargement optical system 20, and thus an image with a large angle of view can be formed. Here, as a value, the length of the side LL1=0.8 inches.

In a virtual image display device such as an HMD, an angle of view has been widened, and thus an optical system has a very short focal distance. Here, as for an FOV, a half angle of view is 50°, that is, a full angle of view is 100°. In order to satisfy the above-described conditions, the respective dimensions described above are as follows: The entire length of the enlargement optical system 20 is LD1=14 mm. The length of the eye relief is LE1=10 mm. The diameter of the eye ring is RE1=6 mm. Further, a curvature radius of a lens surface, that is, a curvature radius of each of the convex surface CV of the first lens L1 and the concave surface CC of the second lens L2 is 44.2 mm.

Figure 4:
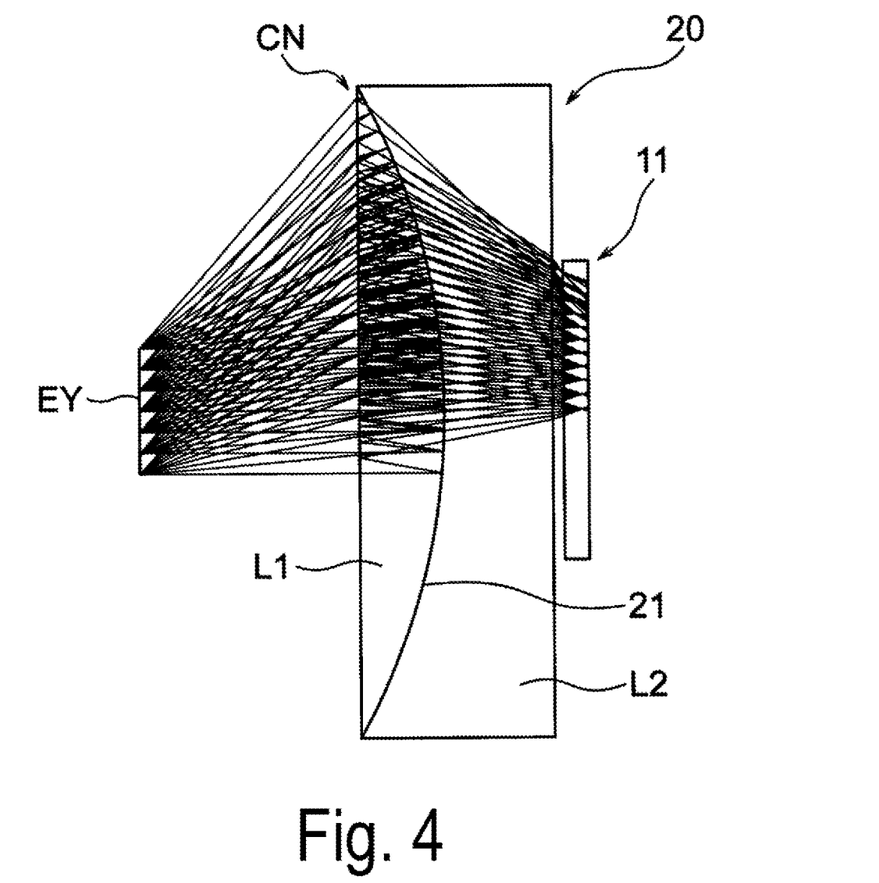
FIG. 4 illustrates a ray diagram in another example of the virtual image display device.

FIG. 4 is a ray diagram in another example of the virtual image display device 100, and illustrates a case in which, for the two lenses L1 and L2, as glass materials each with a different refractive index, the first lens L1 with a refractive index $n_1=1.95$, and the second lens L2 with a refractive index $n_2=1.82$ are used, as an example. Additionally, as for an Abbe's number of each glass material, an Abbe's number of the first lens L1 is $v_2=32.3$, and an Abbe's number of the second lens L2 is $v_2=24.1$. In this case, relation $v_2>v_2$ holds. That is, an Abbe's number $v_1$ of the first lens L1 is larger than an Abbe's number $v_2$ of the second lens L2.

As a case in which glass materials each with a different refractive index are used, other than the cases illustrated in FIG. 3 and FIG. 4, for example, a case is conceivable in which the first lens L1 with a refractive index $n_1=1.85$ and an Abbe's number $v_2=40$ is used, and the second lens L2 with a refractive index $n_2=1.50$, and an Abbe's number $v_2=82$ is used.

In the case of FIG. 3, FIG. 4, or the like, by utilizing the surface shape of the lens surface, and the refractive index difference for the two lenses L1 and L2, the optical path of the image light with the above angle of view, that is, the image light GL is formed.

Additionally, in the case of each of the above figures, since the lens surface is the spherical surface lens, a more highly refractive material can be applied. It is conceivable that, in a case that curvature of the lens surface can be suppressed by applying the more highly refractive material, a Petzval curvature can be suppressed, and a field curvature can also be reduced. Note that, adjustment of the curvature of the lens surface, reduction of a Petzval sum obtained by accumulating the Petzval curvatures for the entire optical system due to the refraction action and the reflection action, and the like, based on materials to be applied can be considered, and details will be described later.

Figure 5:
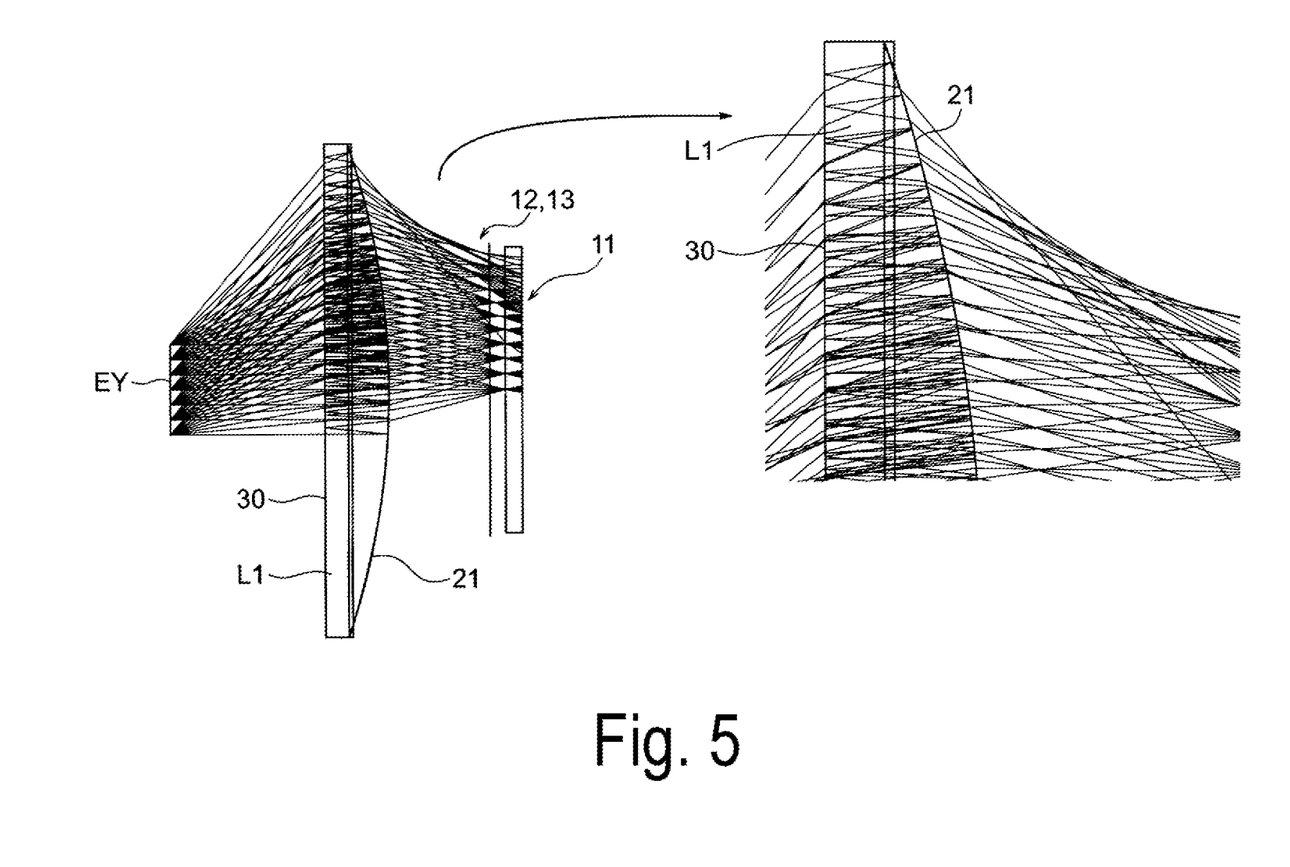
FIG. 5 illustrates a ray diagram in an example of a virtual image display device in a comparative example.

FIG. 5 is a ray diagram in an example of a virtual image display device in a comparative example. The virtual image display device 100 in the comparative example differs from the case of the exemplary embodiment, and an optical system is configured with a single lens. Specifically, the lens L1 in FIG. 5 is a planoconvex lens, includes the transmission/reflection selection member 30 on a flat surface side, and includes the half mirror 21 on a convex surface side. Additionally, the polarization plate 12 and the incident side polarization conversion member 13 are provided on an image display device 10 side. In the above case, an optical path of image light is folded as in the cases in the other figures. However, in a configuration in FIG. 5, for example, when image formation as in the present application is attempted, for example, a ray with a half angle that is FOV 50° for one side, that is, an uppermost ray, as illustrated in an enlarged portion of the figure, when entering onto a lens surface of the first lens L1, is in a state of just barely satisfying the total reflection condition. Specifically, when the refractive index of the lens L1 is 2.0, a curvature radius R=−54 mm is a limit for satisfying the total reflection condition. In this case, there is also a limit for reducing a focal distance, and, for example, it is difficult to configure a small panel size as in the present application. On the other hand, in the case of FIG. 5, since the lens surface is a border between the lens and air, an effect of refraction is large, and strong power can be generated by combining both the effect of refraction and an effect of reflection, but, as a result, a strong field curvature and a color aberration occur on a surrounding part. In view of this, in the present application, as described above, other than the combination of the first lens L1 and the second lens L2, by including the above-described various configurations, a requirement for a light incident angle is relaxed, compared to a case of using a lens having a curved surface such as the first lens L1 being a convex spherical surface lens illustrated in the comparative example in FIG. 5.

As described above, in the exemplary embodiment, by adopting a configuration in which the first lens L1 and the second lens L2 are bonded, reduction in size or thickness is achieved. On the other hand, the half mirror 21 is provided in the bonding portion CN between the convex surface CV and the concave surface CC in an optical path to give power in folding the optical path, and further, since the refractive index $n_1$ of the first lens L1 is larger than the refractive index $n_2$ of the second lens L2, an image with a wide angle of view can be formed.

Figure 6:
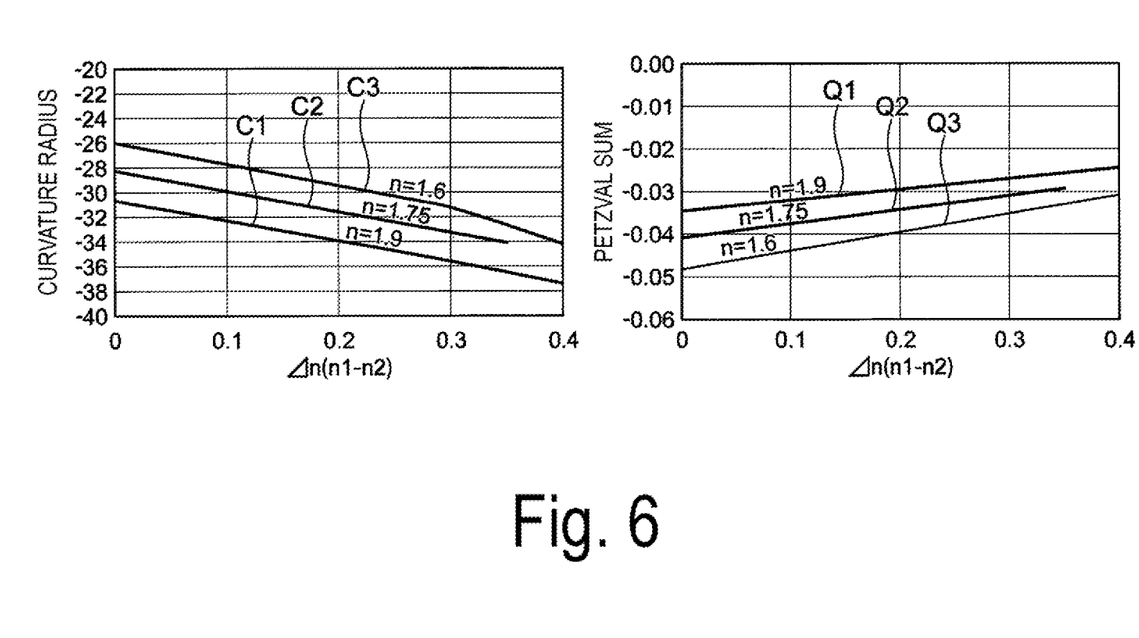
FIG. 6 shows a graph illustrating relation between a difference between refractive indice of a first lens and a second lens, and a curvature radius, and a graph illustrating relation between the difference between refractive indice of the first lens and the second lens, and a Petzval sum.

With reference to FIG. 6 and the like, glass materials applied to the first lens L1 and the second lens L2 will be considered below.

Figure 7A:
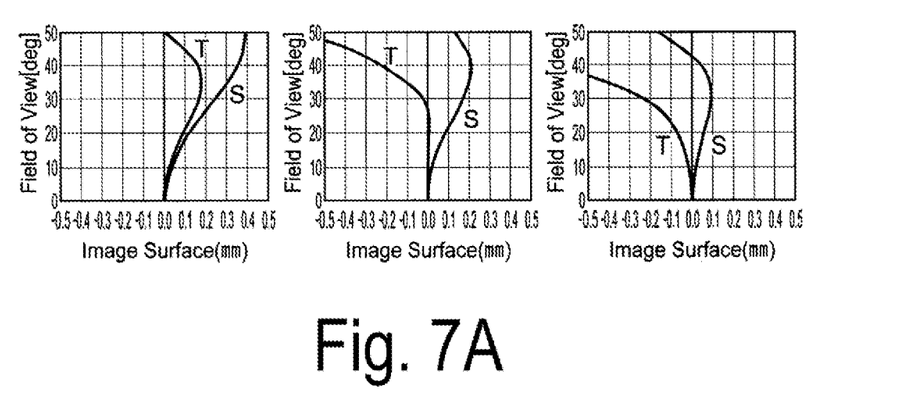
FIG. 7A shows graphs each illustrating relation between a difference between refractive indice of the first lens and the second lens, and an aberration.
Figure 7B:
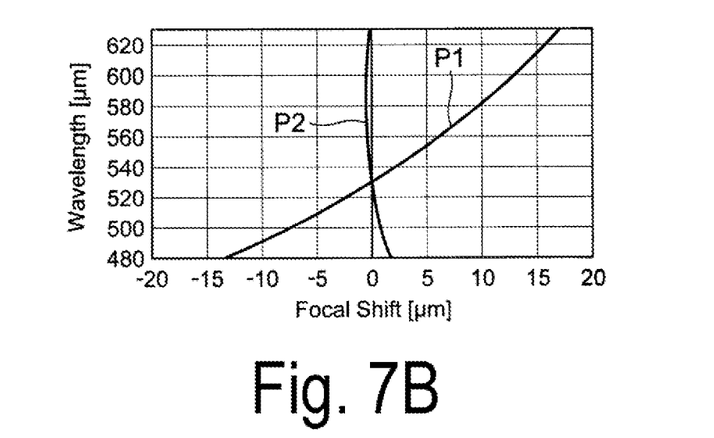
FIG. 7B shows a graph illustrating relation between a glass material and a vertical color aberration.

Note that, FIG. 6 shows a graph illustrating relation between a difference between respective refractive indice of the first lens L1 and the second lens L2 and a curvature radius, and a graph illustrating relation between the difference between the first lens L1 and the second lens L2 and a Petzval sum. FIG. 7A illustrates graphs each illustrating relation between a difference between respective refractive indice of the first lens L1 and the second lens L2 and an aberration. FIG. 7B is a graph illustrating relation between a glass material and a vertical color aberration.

First, as a precondition, in the configuration of the exemplary embodiment, the number of optical surfaces is low, and it is very difficult to suppress each aberration by using the first lens L1 and the second lens L2. That is, all of five Seidel aberrations, that is, a spherical aberration, a coma aberration, astigmatism, a field curvature, and distortion, and additionally, a color aberration cannot virtually be suppressed. Additionally, in the above setting with the wide angle of view, a focal distance of the optical system is about 6 mm because of relation between the angle of view and a height of statue, and thus it is difficult to add a new lens. Thus, here, aberration correction is not performed in the optical system for the distortion and a horizontal color aberration that are correctable aberrations in image processing, and suppression of the spherical aberration, the coma aberration, the astigmatism, the field curvature, and the vertical color aberration is preferentially considered.

Here, image recognition in a peripheral angle of view will be considered. First, a human effective visual field (an area in which information can be instantly accepted only with eye movement) is defined as horizontally ±30° and vertically ±20°, and in an effective visual field area being an area corresponding to this range, detailed information can be read without moving the head. Thus high performance is required also for resolution performance of an HMD. That is, for an area with a peripheral angle of view within FOV ±30°, the spherical aberration, the coma aberration, the astigmatism, and the field curvature need to be suppressed.

On the other hand, as curvature of each lens increases (a curvature radius decreases), strong aberration occurs. For example, when achievement of a focal distance of 6 mm is attempted by a curved surface shape, an optical surface with strong power is required, that is, there is no choice but to increase curvature. Accordingly, in the above description, increasing the refractive index $n_1$ of the first lens L1 enables to reduce the curvature with identical power, and further, to suppress the aberrations.

Additionally, among the aberrations to be corrected, the field curvature is largely influenced. In order to suppress the field curvature, it is necessary to reduce the Petzval sum toward 0. When, on each optical surface, power is $\varphi_i$, an incident side refractive index is $n_i$, an emitting side refractive index is $n_{i+1}$, and a focal distance is f, then the Petzval sum is expressed by $$\sum_i -\frac{\varphi_i}{n_i n_{i+1}}.$$

Additionally, on each of a transmissive surface and a concave surface mirror, the power $\varphi_i$ can be expressed by $$\varphi_i = -\frac{1}{f} = \frac{n_{i+1} - n_i}{r_i}$$

$$\varphi_i = -\frac{1}{f} = \frac{2 \times n_i}{r_i}.$$

Here, a lens curvature radius and a Petzval sum when the focal distance f of the optical system in the virtual image display device 100 is fixed at f=6 mm, and respective refractive indice of the first lens L1 and the second lens L2 are changed will be verified.

As described above, FIG. 6 illustrates the relation between the difference between the respective refractive indice of the first lens L1 and the second lens L2 and the curvature radius, and the relation between the difference between the respective refractive indice of the first lens L1 and the second lens L2 and the Petzval sum. In a graph on a left side in FIG. 6, a horizontal axis indicates a difference between respective refractive indice of the first lens L1 and the second lens L2, and a vertical axis indicates a curvature radius necessary for the above setting of f=6 mm. Curves C1 to C3 indicate cases in which the refractive indice $n_2$ of the first lens L1 are 1.9, 1.75, and 1.6, respectively.

The above graphs show that, as the refractive index $n_1$ of the first lens L1 increases, the curvature radius can be suppressed. This means that, increasing the refractive index $n_1$ of the first lens L1 corresponds to generating identical power even with a larger curvature radius. Additionally, as the refractive index $n_2$ of the second lens L2 is made smaller than the refractive index $n_1$ of the first lens L1, the curvature radius can be reduced. This is because, when light enters the first lens L1 from the second lens L2, positive power occurs due to a refractive index difference between the two lenses. The optical system as a whole is configured to be capable of generating larger power, because positive power occurs both at transmission through a curved surface of the first lens L1, and at reflection on the curved surface of the first lens L1.

In a graph on a right side in FIG. 6, a horizontal axis indicates a difference between respective refractive indice of the first lens L1 and the second lens L2, and a vertical axis indicates a Petzval sum. Curves Q1 to Q3 indicate cases in which the refractive indice $n_1$ of the first lens L1 are 1.9, 1.75, and 1.6, respectively.

According to the above graph, as the refractive index of the first lens L1 increases, and as the refractive index difference between the first lens L1 and the second lens L2 increases, the Petzval sum also approaches zero. This is because, as described above, as the refractive index difference increases, the curvature radius decreases, and thus the Petzval sum approaches zero.

As described above, FIG. 7A illustrates reduction side aberration graphs each illustrating relation between a difference between respective refractive indice of the first lens L1 and the second lens L2 and the field curvature occurrence on a panel surface according to an angle of view.

In FIG. 7A, a state of a field curvature for each of cases in which the refractive index of the first lens L1 is $n_1$=1.9, and the refractive indice of the second lens L2 are $n_2$=1.9, 1.7, and 1.5, is indicated, and thus these cases are comparable. FIG. 7A shows that, in an effective visual field area with a visual field angle equal to or less than 30°, the field curvature is suppressed around the refractive index $n_2$=1.7 to 1.5 to some extent. However, in a peripheral visual field area to be a non-paraxial area closer to a peripheral side than the effective visual field area, the field curvature occurs strongly. Additionally, the astigmatism tends to increase in a wide visual field angle area, but as a refractive index difference increases, the astigmatism increases even with an identical visual field angle.

From the above, as illustrated in FIG. 6, the Petzval sum can be suppressed by increasing the refractive index, but when the astigmatism, and the field curvature in the wide visual field angle area are considered, it is conceivable that, in the above illustration, $n_1$=1.9/$n_2$=1.6 results in the best state of extent of the aberration. Additionally, when the above described matters are taken into consideration, as an idea, it is shown that providing a certain degree of refractive index difference or more is important. In particular, from the matters illustrated in FIG. 3 and the like, it is conceivable and desirable that the refractive index difference between the first lens L1 and the second lens L2 is equal to or larger than 0.4. On the other hand, depending on circumstances, it is conceivable that while a certain degree of refractive index difference is provided, keeping the difference within a certain degree of range is effective in some cases. In this case, it is conceivable and desirable that the refractive index difference between the first lens L1 and the second lens L2 is equal to or larger than 0.3 and equal to or less than 0.5.

Additionally, in this configuration, the refractive index $n_1$ of the first lens L1 is desirably equal to or larger than 1.8. By setting the refractive index $n_1$ to be equal to or larger than 1.8, in the above settings, the field curvature in the effective visual field area can be suppressed to 0.15 mm or less, and thus virtually necessary resolution performance can be secured.

Further, it is conceivable that a configuration in which the vertical color aberration can be suppressed is obtained by selecting materials such that, for the Abbe's number $v_1$ of the first lens L1 and the Abbe's number $v_2$ of the second lens L2, $v_1 > v_2$ holds.

FIG. 7B illustrates, as described above, relation between a glass material and a vertical color aberration for each of the first lens L1 and the second lens L2. In FIG. 7B, for a glass material of the first lens L1 for which a curve P1 indicates a characteristic, the refractive index $n_1$=1.82, and the Abbe's number $v_1$=33.3. Compared to this, for a glass material of the second lens L2 for which a curve P2 indicates a characteristic, the refractive index $n_2$=1.81, and the Abbe's number $v_2$=24.1. In this way, it is shown that in a case in which as the glass material of the second lens L2, a glass material with a substantially identical refractive index to that of a glass material of the first lens L1, although the refractive index of the first lens L1 is slightly higher, and a different Abbe's number is applied, as in the above example, and a glass material with an Abbe's number smaller than that of the glass material of the first lens L1 is used for the second lens L2, the vertical color aberration can almost be resolved in some cases.

Figure 8:
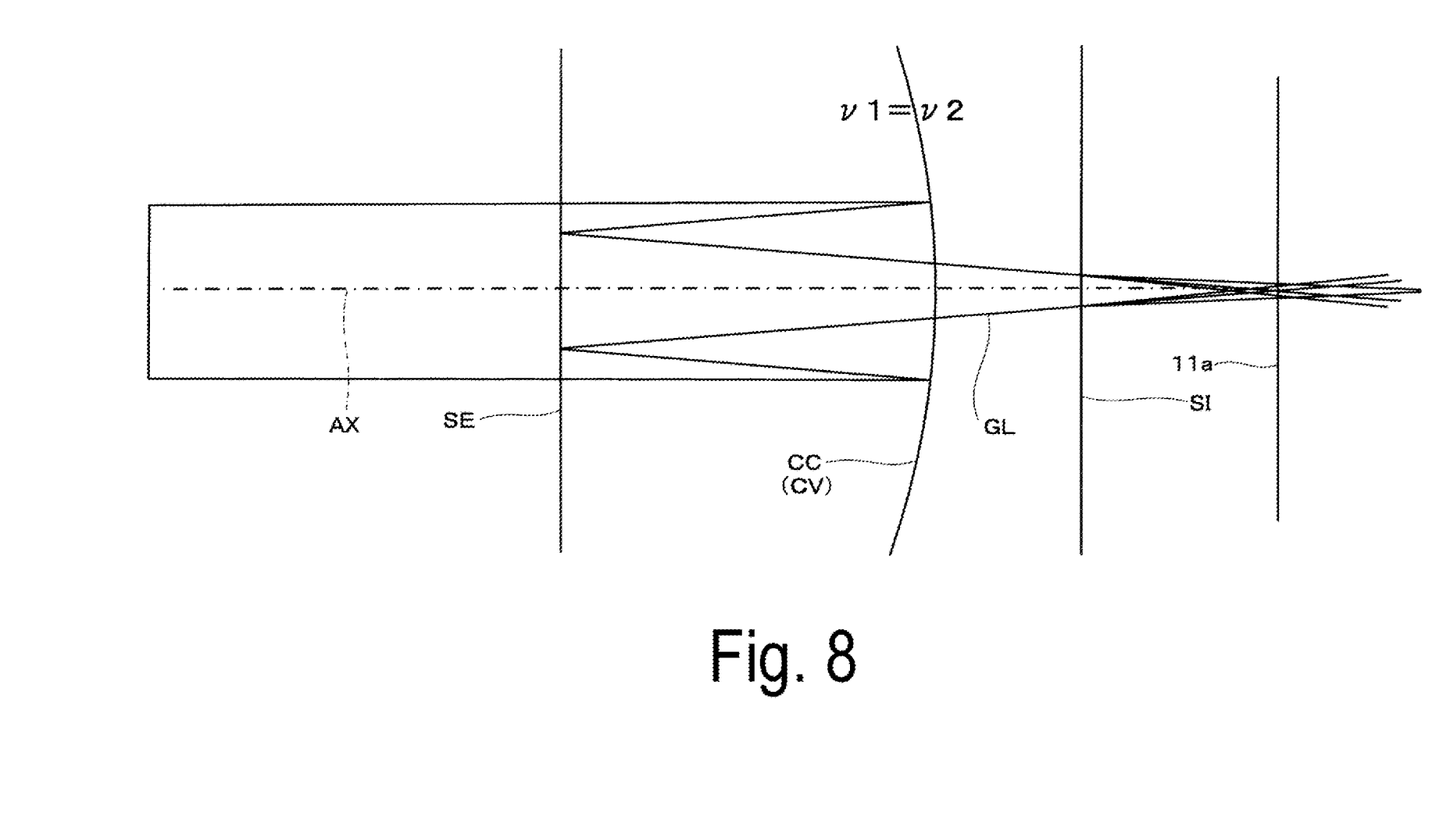
FIG. 8 illustrates a ray diagram describing a state of chromatic dispersion.

Note that, FIG. 8 illustrates a ray diagram indicating a state of chromatic dispersion for each wavelength of RGB corresponding to circumstances of the Abbe's numbers. This ray diagram illustrates a state of chromatic dispersion occurring when a ray trace is performed from an emission pupil side. When Abbe's numbers of both the lenses are identical, dispersion causing an axial color aberration occurs only at refraction on a flat surface of the second lens L2. Thus, in FIG. 8, the color aberration occurs on the flat surface. By applying materials such that v1>v2 holds, in order to offset this color aberration, occurrence of the vertical color aberration caused by an optical system element can be suppressed.

Various modified examples will be described below with reference to FIG. 9A and the like.

Figure 9A:
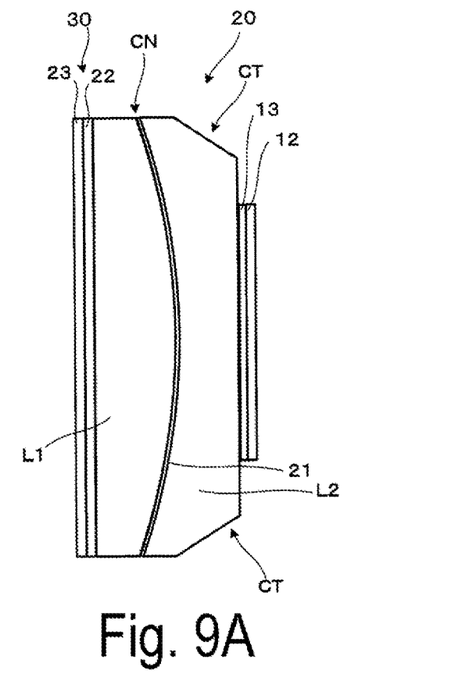
FIG. 9A illustrates a conceptual side view illustrating an optical system configuring a virtual image display device of a modified example.
Figure 9B:
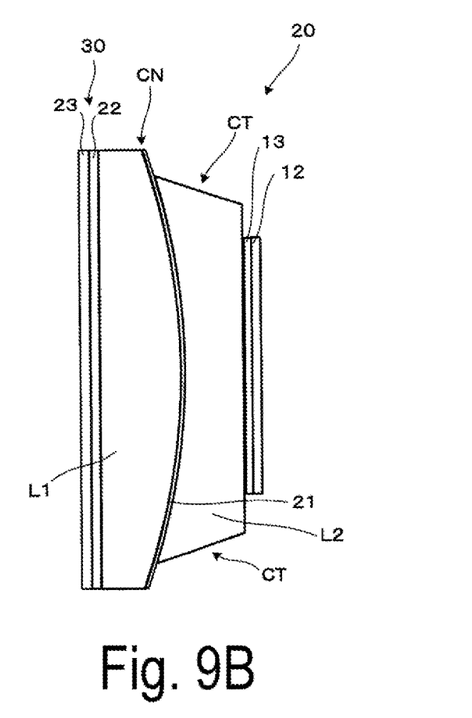
FIG. 9B illustrates a conceptual side view illustrating an optical system configuring a virtual image display device of another modified example.

First, FIG. 9A is a diagram illustrating a virtual image display device of a modified example, and is a conceptual side sectional view of the enlargement optical system 20 of the virtual image display device. FIG. 9A is a diagram corresponding to the enlargement optical system 20 of the virtual image display device illustrated in FIG. 1. In the modified example, a cutout portion CT is provided on the second lens L2. For example, as illustrated in FIG. 3 and the like, in the exemplary embodiment, a width of a pencil of rays of the image light GL is the widest at the first lens L1, and is relatively narrow at the second lens L2. Accordingly, for example, as in the illustration, by cutting out part of a portion of the second lens L2 which is outside the optical path of the image light GL and is unlikely to cause stray light or the like, the second lens L2 can be reduced in weight. Note that, various shapes can be considered for the cutout portion CT, and for example, as in another modified example illustrated in FIG. 9B, a cutting method in which part of the half mirror 21 is exposed is also conceivable, as long as functions of other members can be secured. Note that, in this case, for example, configuring the half mirror 21 with a metal film is conceivable.

Figure 10:
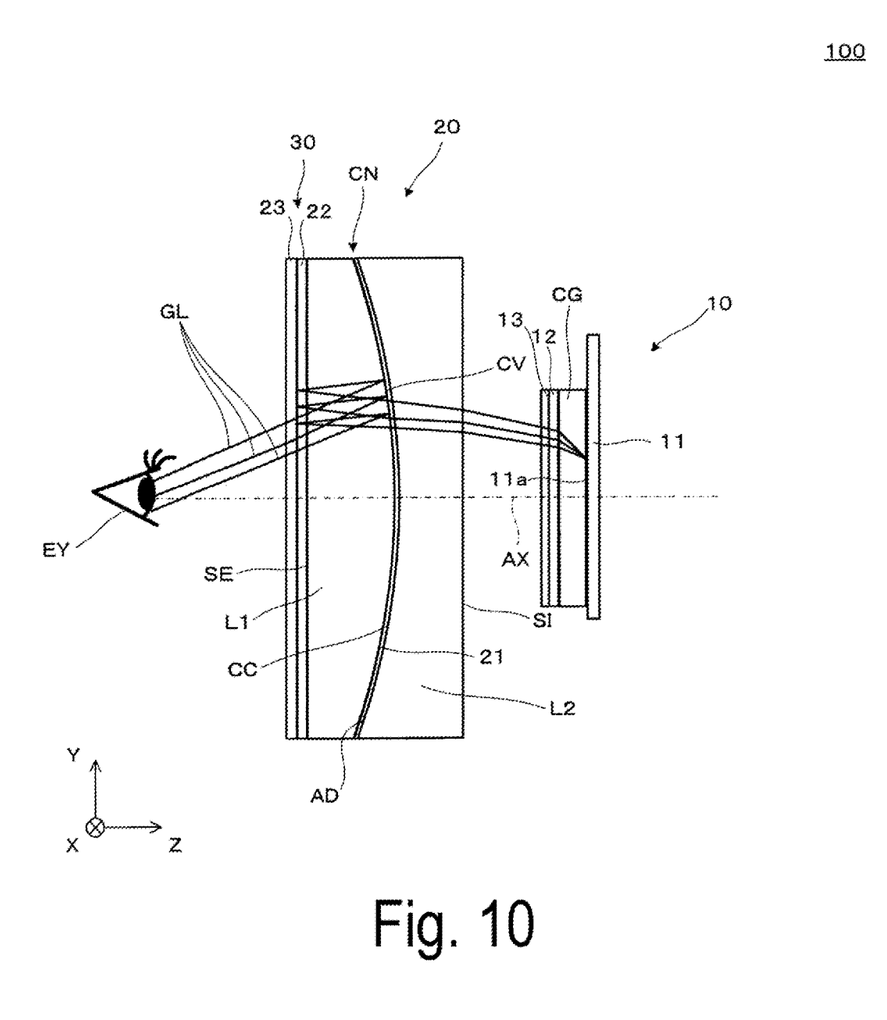
FIG. 10 illustrates a conceptual side sectional view illustrating a virtual image display device of still another modified example.

Additionally, in the above configuration, the polarization plate 12 and the incident side polarization conversion member 13 are provided on the enlargement optical system 20 side, but for example, as illustrated in FIG. 10, a configuration in which the polarization plate 12 and the incident side polarization conversion member 13 are provided on the image display device 10 side may be adopted.

The Others

Thus far, the invention has been described based on some exemplary embodiments. Note that, however, the invention is not limited to the above-described exemplary embodiments, and can be embodied in various aspects without departing from the spirit and scope of the invention.

In the above description, the image display device 10 is, for example, configured with a light-emitting type element (OLED) such as organic EL, but in this case, for example, one that emits circularly polarized image light may be adopted, and the polarization plate or the quarter wavelength plate may be omitted.

Additionally, in the above description, each of the first lens L1 and the second lens L2 is a glass lens, but depending on requirements or the like, a resin lens is also applicable, and for example, it is also conceivable that each of a resin lens with zero birefringence or a resin lens with low birefringence (that is, with orientation birefringence ±0.01 or less, or a resin lens with a photoelastic constant $10[10^{-12}/Pa]$ or less) is used for the configuration to make the birefringence unlikely to occur.

As the image display device 10, in addition to HIPS as a transmissive liquid crystal display device, various kinds of configurations other than those described above are available. For example, a configuration using a reflective liquid crystal display device can be employed, or a digital micromirror device and the like can be used in place of the image display element configured of a liquid crystal display device and the like.

Additionally, occurrence of ghost light or the like may further be suppressed, by appropriately providing AR coating on a lens surface of each lens.

The techniques of the invention may be employed in what is called a closed-type (not see-through type) virtual image display device that makes only image light visually recognized. In addition, the techniques of the invention may also be employed in a device enabling an observer to visually recognize or observe an external world image in a see-through manner, may be applied to what is called a video see-through product configured of a display device and an image device.

Additionally, the techniques of the invention is applicable to a binocular type hand held display or the like.

Further, in the above description, as for a portion on which the half mirror 21 configured with the semi-reflective and semi-transmissive film that transmits part of image light and reflects another part is provided, for example, it is also conceivable that a function equivalent to an action by the half mirror 21 is obtained by providing an optical function surface such as a diffraction element, e.g., a volume hologram, instead of the half mirror.

Additionally, in the above description, the light emitting surface on the front-of-eye side and the light incident surface to which the image light is incident are the light emitting plane SE and the light incident plane SI, respectively, that is both are flat surfaces, but it is conceivable that these surfaces are curved surfaces.

The entire disclosure of Japanese Patent Application No. 2018-031642, filed Feb. 26, 2018 is expressly incorporated by reference herein.

What is claimed is:
1. A virtual image display device, comprising:
an image element configured to display an image;
a first lens disposed at a location where image light from the image element is extracted and including a convex surface facing the image element side;
a second lens disposed further toward the image element side than the first lens and including a concave surface to be bonded to the convex surface of the first lens;
a half mirror provided in a bonding portion between the convex surface and the concave surface; and
a transmission/reflection selection member provided at a light emitting side of the first lens and configured to selectively transmit or reflect the light depending on polarization state of the light, wherein
a refractive index of the first lens is larger than a refractive index of the second lens, and
an Abbe's number of the first lens is larger than an Abbe's number of the second lens.

2. The virtual image display device according to claim 1, wherein
the refractive index of the first lens is equal to or larger than 1.8.

3. The virtual image display device according to claim 1, wherein
a difference between the refractive index of the first lens and the refractive index of the second lens is equal to or larger than 0.3 and equal to or smaller than 0.5.

4. The virtual image display device according to claim 1, wherein the first lens and the second lens are glass lenses, and the convex surface and the concave surface are spherical surfaces.

5. The virtual image display device according to claim 1, wherein
the half mirror is provided on the convex surface by vapor deposition.

6. The virtual image display device according to claim 1, wherein
a size of an image display area of the image element is smaller than a size of an optical surface of the second lens.

7. The virtual image display device according to claim 6, wherein
the image element is a micro display having an image display area, and a length of one side of the image display area is equal to or less than 2.5 inches.

8. The virtual image display device according to claim 1, wherein
the second lens includes a cutout portion.

9. The virtual image display device according to claim 1, wherein
a surface of the first lens at the light emitting side, on which the transmission/reflection selection member is provided, is a flat surface,
the transmission/reflection selection member includes an emitting side polarization conversion member configured to convert a polarization state of the light passing the polarization conversion member, and a semi-transmissive reflection type polarization plate configured to transmit or reflect the light depending on a polarization state of the light that has passed through the polarization conversion member.

* * * * *